United States Patent
Barbieri et al.

(10) Patent No.: US 9,750,030 B2
(45) Date of Patent: Aug. 29, 2017

(54) ENHANCED DOWNLINK RATE ADAPTATION FOR LTE HETEROGENEOUS NETWORK BASE STATIONS

(75) Inventors: Alan Barbieri, San Diego, CA (US); Vikas Jain, San Diego, CA (US); Muruganandam Jayabalan, San Diego, CA (US); Tao Luo, San Diego, CA (US); Saikiran Nudurupati, San Diego, CA (US); Fang Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 13/197,412

(22) Filed: Aug. 3, 2011

(65) Prior Publication Data

US 2013/0033989 A1    Feb. 7, 2013

(51) Int. Cl.
*H04W 72/04* (2009.01)
*H04L 1/00* (2006.01)
(Continued)

(52) U.S. Cl.
CPC ......... *H04W 72/048* (2013.01); *H04L 1/0003* (2013.01); *H04L 1/0009* (2013.01); *H04L 1/0015* (2013.01); *H04L 1/0031* (2013.01); *H04L 1/0086* (2013.01); *H04L 5/0053* (2013.01); *H04L 1/0026* (2013.01);
(Continued)

(58) Field of Classification Search
CPC .................. H04B 7/216; H04L 1/0026; H04L 2001/0092; H04L 1/1812; H04L 1/203; H04W 72/04
See application file for complete search history.

(56) References Cited

U.S. PATENT DOCUMENTS

| 8,842,693 B2 | 9/2014 | Agrawal et al. |
| 2001/0029189 A1* | 10/2001 | Mandyam ............ 455/522 |

(Continued)

FOREIGN PATENT DOCUMENTS

| CN | 1474606 A | 2/2004 |
| EP | 2230786 A1 | 9/2010 |

(Continued)

OTHER PUBLICATIONS

Ericsson et al., "Considerations on Real-Life DL MIMO Aspects", 3GPP Draft; R1-111330 Real Life Issues, 3rd Generation Partnershp-Project (3GPP), Mobile Competence Centre ; 650, Route Des Lucioles ; F-06921 Sophia-Antipolis Cedex; France, vol. RAN WG1, no. Barcelona, Spain; May 9, 2011, May 3, 2011 (May 3, 2011), XP050491057, [retrieved on May 3, 2011] * section 2 *.

(Continued)

*Primary Examiner* — Anez Ebrahim
(74) *Attorney, Agent, or Firm* — Norton Rose Fulbright US LLP

(57) ABSTRACT

Downlink rate adaptation in wireless communication systems are disclosed in which a UE reports RIs for both interference-free and interference-limited subframes. In general, the RI for the interference-free subframes will be higher than the RI reported for the interference-limited subframes. However, an eNB selects an RI and a transmission rate for interference-limited subframes based on what the UE can sustain instead of based only on the RI reported by the UE.

42 Claims, 9 Drawing Sheets

(51) Int. Cl.
*H04L 5/00* (2006.01)
*H04L 1/18* (2006.01)
*H04L 1/20* (2006.01)

(52) U.S. Cl.
CPC ............ *H04L 1/1812* (2013.01); *H04L 1/203* (2013.01); *H04L 2001/0092* (2013.01)

(56) References Cited

U.S. PATENT DOCUMENTS

| | | | |
|---|---|---|---|
| 2002/0106015 A1* | 8/2002 | Zehavi | 375/225 |
| 2002/0137457 A1* | 9/2002 | Nivens | H04B 7/18513 455/13.4 |
| 2003/0031135 A1* | 2/2003 | Itoh | 370/252 |
| 2005/0169391 A1 | 8/2005 | Takeda | |
| 2007/0254652 A1* | 11/2007 | Khan | H04B 7/0417 455/435.1 |
| 2008/0279093 A1 | 11/2008 | Hassan et al. | |
| 2009/0047961 A1* | 2/2009 | Kim | 455/436 |
| 2009/0086648 A1* | 4/2009 | Xu | H04B 7/0689 370/252 |
| 2009/0196216 A1 | 8/2009 | Onodera | |
| 2009/0201885 A1* | 8/2009 | Kuroda | H04L 5/0091 370/335 |
| 2011/0009148 A1 | 1/2011 | Kotecha | |
| 2011/0032839 A1 | 2/2011 | Chen et al. | |
| 2011/0103295 A1 | 5/2011 | Khandekar et al. | |
| 2011/0110278 A1 | 5/2011 | Onodera | |

FOREIGN PATENT DOCUMENTS

| | | |
|---|---|---|
| JP | 2011004212 A | 1/2011 |
| KR | 20100080548 A | 7/2010 |
| WO | WO-2006130541 A2 | 12/2006 |
| WO | WO-2010056161 A1 | 5/2010 |
| WO | WO-2010106549 A2 | 9/2010 |
| WO | WO/2010/147416 A2 | 12/2010 |
| WO | WO2010147416 A2 | 12/2010 |
| WO | WO/2011/055989 A2 | 5/2011 |
| WO | WO2011055989 A2 | 5/2011 |

OTHER PUBLICATIONS

Intel Corporation: "Real life issues for DL-MIMO", 3GPP Draft; R1-111596, 3rd Generation Partnership Project (3GPP), Mobile Competence Centre ; 650, Route Des Lucioles ; F-06921 Sophia-Antipolis Cedex; France, vol. RAN WG1, no. Barcelona, Spain; May 9, 2011, May 3, 2011 (May 3, 2011), XP050491242, [retrieved on May 3, 2011] * section 3 *.

International Search Report and Written Opinion—PCT/US2011/046627—ISA/EPO—Feb. 16, 2012.

3GPP TS 36.201 V10.0.0 (Dec. 2010), 3rd Generation Partnership Project; Technical Specification Group Radio Access Network; Evolved Universal Terrestrial Radio Access (E-UTRA); LTE physical layer; General description (Release 10).

3GPP TS 36.211 V10.0.0 (Dec. 2010), 3rd Generation Partnership Project; Technical Specification Group Radio Access Network; Evolved Universal Terrestrial Radio Access (E-UTRA); Physical channels and modulation (Release 10).

3GPP TS 36.212 V10.0.0 (Dec. 2010), 3rd Generation Partnership Project; Technical Specification Group Radio Access Netowrk; Evolved Universal Terrestrial Radio Access (E-UTRA); Multiplexing and channel coding (Release 10).

3GPP TS 36.213 V10.0.0 (Dec. 2010), 3rd Generation Partnership Project; Technical Specification Group Radio Access Network; Evolved Universal Terrestrial Radio Access (E-UTRA); Physical layer procedures (Release 10).

3GPP TS 36.321 V10.0.0 (Dec. 2010), 3rd Generation Partnership Project; Technical Specification Gruop Radio Access Network; Evolved Universal Terrestrial Radio Access (E-UTRA); Medium Access Control (MAC) protocol specification (Release 10).

"Quick Recap of MIMO in LTE and LTE Advanced", NTT DOCOMO Technical Journal, vol. 12, No. 2; Mar. 30, 2011.

* cited by examiner

ENHANCED DOWNLINK RATE ADAPTATION FOR LTE HETEROGENEOUS NETWORK BASE STATIONS

BACKGROUND

Field

Aspects of the present disclosure relate generally to wireless communication systems, and more particularly, to an enhanced downlink rate adaptation for LTE heterogeneous network evolved Node Bs (eNBs).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure are directed to rate adaptation for downlink transmissions in wireless communication systems in which communication subframes are divided between interference-limited subframes and interference-free subframes. UEs report RIs for both types of subframes. In general, the RI for the interference-free subframes will be higher than the RI reported for the interference-limited subframes. However, if the neighboring cell is only partially loaded, the UE may be able to sustain a transmission rate higher than that supported by the reported RI. The aspects of the present disclosure provide for an eNB to determine an RI for interference-limited subframes based on what the UE can sustain instead of only based on the RI reported by the UE.

In one aspect of the disclosure, a method of wireless communication includes receiving a first rank indication from a UE, the first rank indication corresponding to a first set of resources. The method further includes receiving a second rank indication from the UE, the second rank indication corresponding to a second set of resources. The method further includes selecting a transmission rank and setting a transmission rate sustainable by the UE on the first set of resources, where the selected transmission rank is different from the first rank indication. The method further includes transmitting data packets to the UE on the first set of resources using the selected transmission rank and transmission rate, and transmitting data packets to the UE on the second set of resources using the second rank indication and a second transmission rate based on the second rank indication.

In an additional aspect of the disclosure, an eNB configured for wireless communication includes means for receiving a first rank indication from a UE, the first rank indication corresponding to a first set of resources, means for receiving a second rank indication from the UE, the second rank indication corresponding to a second set of resources, means for selecting a transmission rank and setting a transmission rate sustainable by the UE on the first set of resources, where the selected transmission rank is different from the first rank indication, means for transmitting data packets to the UE on the first set of resources using the selected transmission rank and transmission rate, and means for transmitting data packets to the UE on the second set of resources using the second rank indication and a second transmission rate based on the second rank indication.

In an additional aspect of the disclosure, a computer program product has a computer-readable medium having program code recorded thereon. This program code includes code to receive a first rank indication from a UE, the first rank indication corresponding to a first set of resources, code to receive a second rank indication from the UE, the second rank indication corresponding to a second set of resources, code to select a transmission rank and setting a transmission rate sustainable by the UE on the first set of resources, where the selected transmission rank is different from the first rank indication, code to transmit data packets to the UE on the first set of resources using the selected transmission rank and transmission rate, and code to transmit data packets to the UE on the second set of resources using the second rank indication and a second transmission rate based on the second rank indication.

In an additional aspect of the disclosure, an apparatus includes at least one processor and a memory coupled to the processor. The processor is configured to receiving a first rank indication from a UE, the first rank indication corresponding to a first set of resources. The processor is further configured to receive a second rank indication from the UE, the second rank indication corresponding to a second set of resources. The processor is also configured to select a transmission rank and setting a transmission rate sustainable by the UE on the first set of resources, where the selected transmission rank is different from the first rank indication, to transmit data packets to the UE on the first set of resources using the selected transmission rank and transmission rate, and to transmit data packets to the UE on the second set of resources using the second rank indication and a second transmission rate based on the second rank indication.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
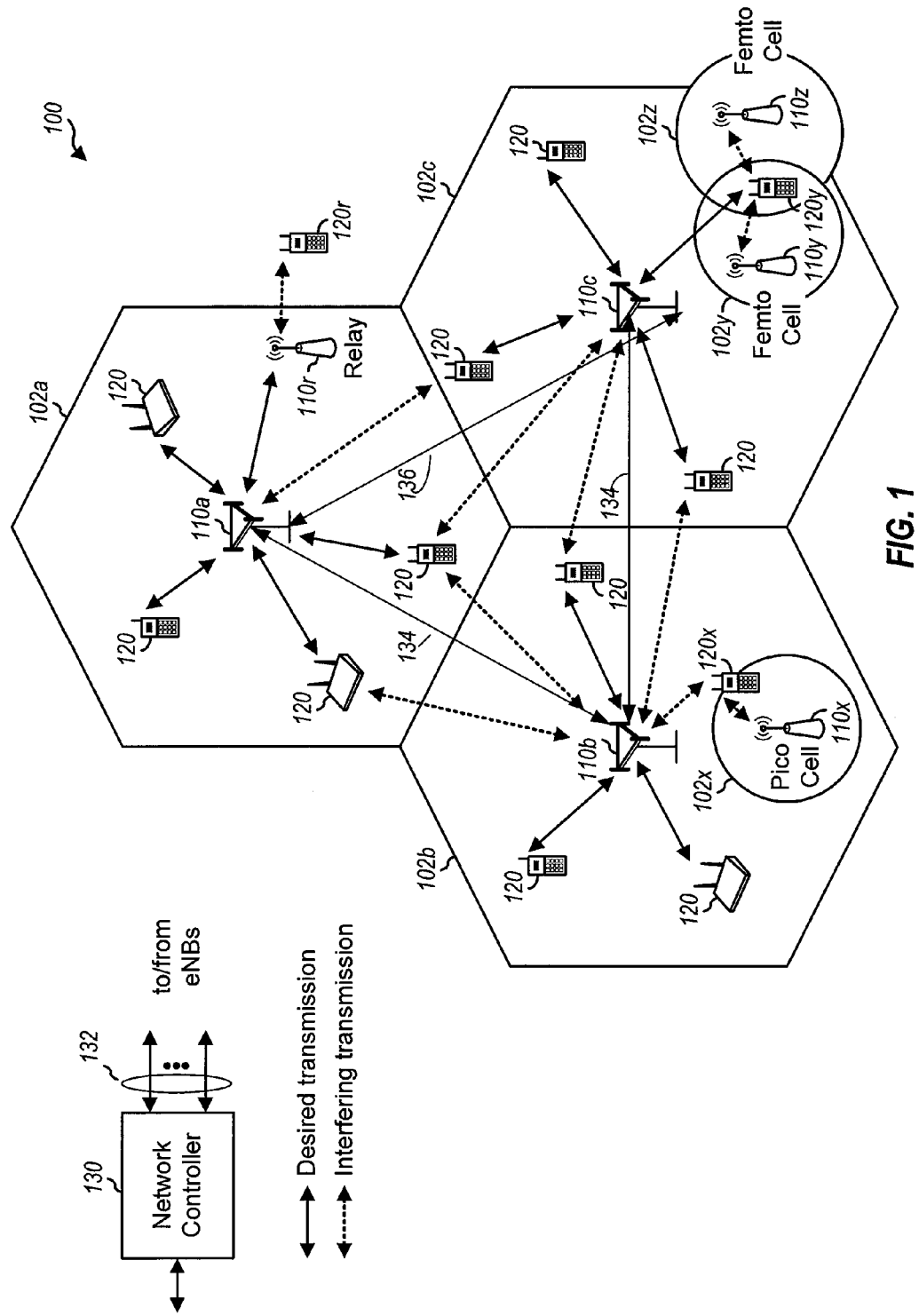
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, or 20 MHz, respectively.

Figure 2:
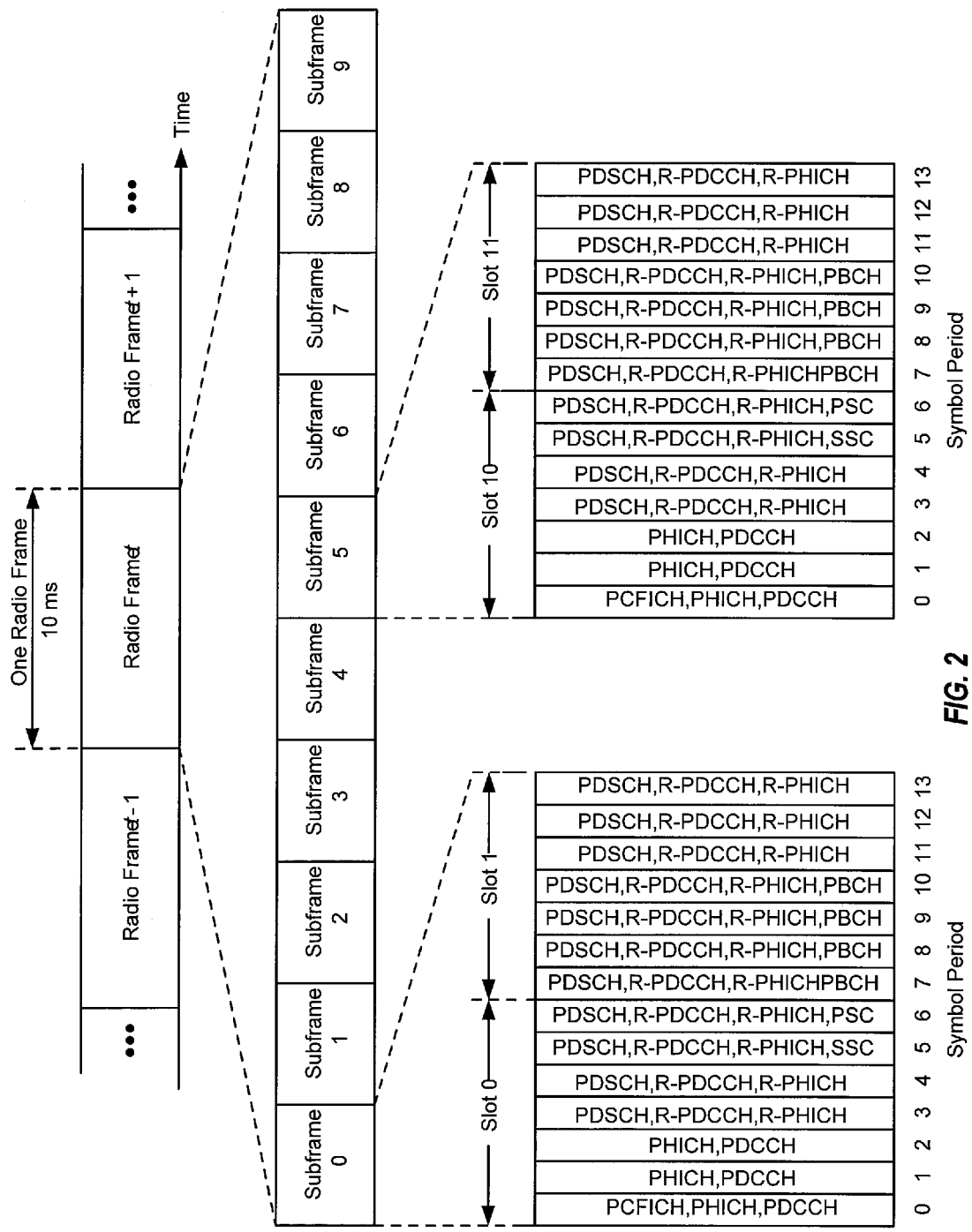
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110*a-c* are usually carefully planned and placed by the provider of the wireless network 100. The macro eNBs 110*a-c* generally transmit at high power levels (e.g., 5 W-40 W). The pico eNB 110*x* and the relay station 110*r*, which generally transmit at substantially lower power levels (e.g., 100 mW-2 W), may be deployed in a relatively unplanned manner to eliminate coverage holes in the coverage area provided by the macro eNBs 110*a-c* and improve capacity in the hot spots. The femto eNBs 110*y-z*, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110*y-z* typically also transmit at substantially lower power levels (e.g., 100 mW-2 W) than the macro eNBs 110*a-c*.

In a heterogeneous network, such as the wireless network 100, in order for UEs to obtain service from the lower-powered eNBs, such as the pico eNB 110*x* or femto eNBs 110*y-z*, in the presence of the stronger downlink signals transmitted from the higher-powered eNBs, such as the macro eNBs 110*a-c*, the lower-powered eNBs 110*x-z* engage in control channel and data channel interference coordination with the dominant interfering ones of the macro eNBs 110*a-c*. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected/interference-free subframes (U subframes), prohibited/interference-free subframes (N subframes), and common/interference-limited subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 3:
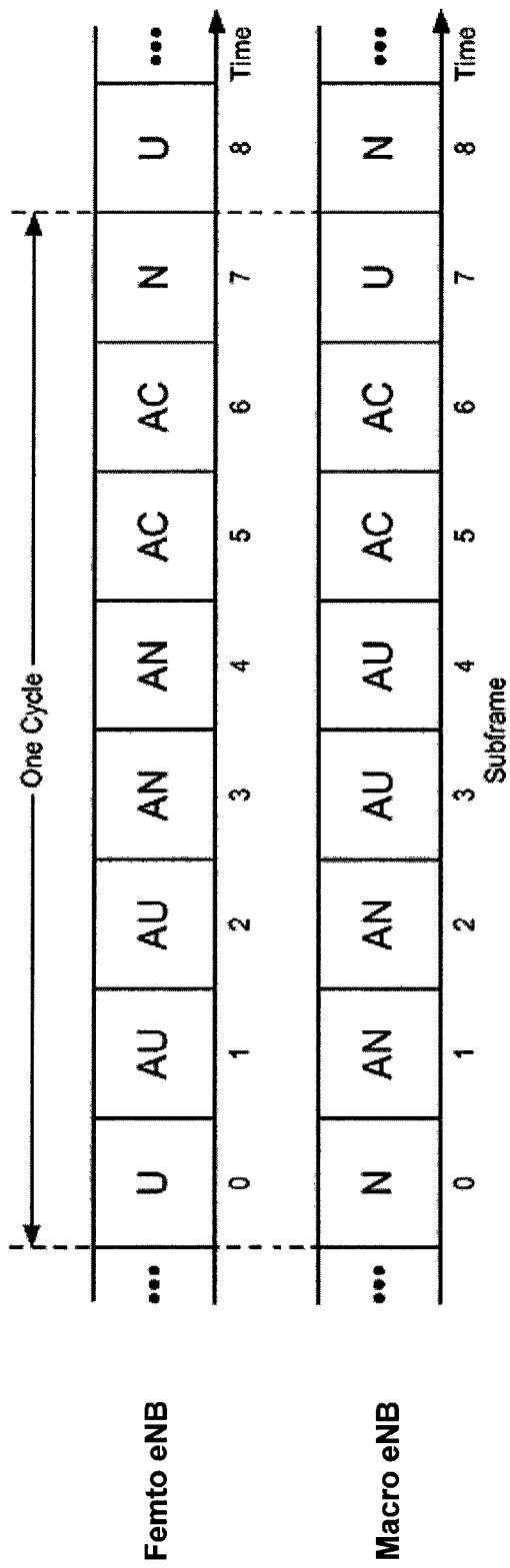
FIG. 3 is a block diagram conceptually illustrating time division multiplexed (TDM) partitioning in a heterogeneous network according to one aspect of the disclosure.

FIG. 3 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

Figure 4:
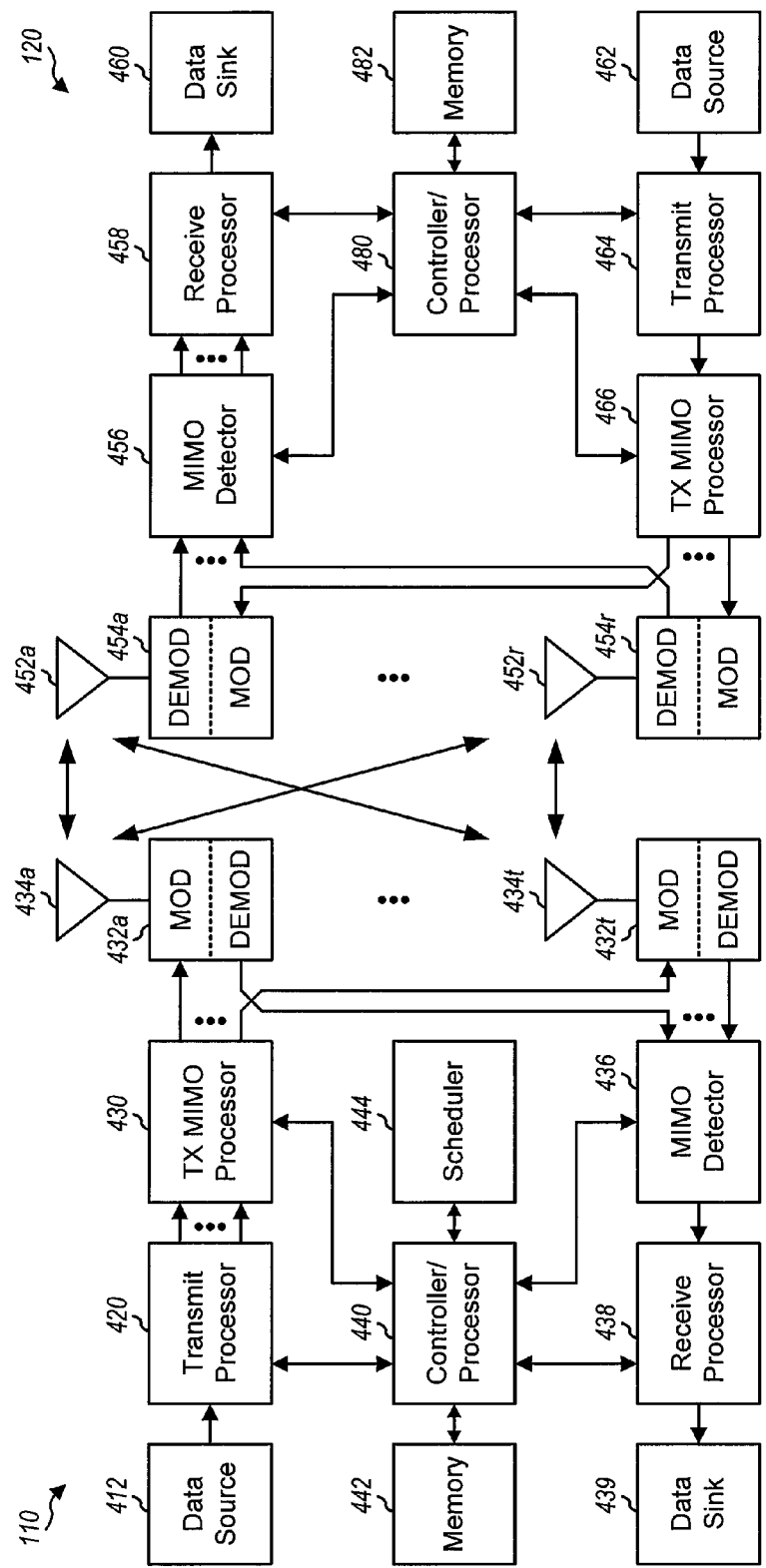
FIG. 4 is a block diagram conceptually illustrating a design of a base station/eNB and a UE configured according to one aspect of the present disclosure.

FIG. 4 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 434a through 434t, and the UE 120 may be equipped with antennas 452a through 452r.

At the eNB 110, a transmit processor 420 may receive data from a data source 412 and control information from a controller/processor 440. The control information may be for the PBCH, PCFICH, PHICH, PDCCH, etc. The data may be for the PDSCH, etc. The transmit processor 420 may process (e.g., encode and symbol map) the data and control information to obtain data symbols and control symbols, respectively. The transmit processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the eNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 110. At the eNB 110, the uplink signals from the UE 120 may be received by the antennas 434, processed by the modulators 432, detected by a MIMO detector 436 if appli-cable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the eNB 110 and the UE 120, respectively. The controller/processor 440 and/or other processors and modules at the eNB 110 may perform or direct the execution of various processes for the techniques described herein. The controllers/processor 480 and/or other processors and modules at the UE 120 may also perform or direct the execution of the functional blocks illustrated in FIGS. 6, 8, 9, and 11-13, and/or other processes for the techniques described herein. The memories 442 and 482 may store data and program codes for the eNB 110 and the UE 120, respectively. A scheduler 444 may schedule UEs for data transmission on the downlink and/or uplink.

In LTE networks, data transmission rate for downlink transmissions may be adapted to take advantage of radio channel conditions. Downlink rate adaptation refers to adapting the modulation and coding scheme (MCS), which encompasses the modulation order and code rate of a transmission, and transport block (TB) count that may be applied to a UE's PDSCH transmission. The adaptation is generally based on radio channel conditions in order to meet the desired HARQ termination success rate. In general, downlink rate adaptation procedures utilizes inputs from the UE, such as the reported channel quality indicator (CQI), the rank indicator (RI), and the HARQ transmission status (ACK/NACK) of the PDSCH transmissions. The downlink rate adaptation procedures may also use the UE's Doppler state (generally inferred at the eNB based on uplink transmissions) and the UE's downlink transmission mode.

In LTE heterogeneous networks, with the downlink frames divided between interference-free subframes (e.g., protected/prohibited subframes, U, N, AU, AN) and interference-limited subframes (e.g., common subframes, C, AC), LTE eNBs operate two independent rate adaptation loops: one for interference-free subframes and one for interference-limited subframes. Each loop uses the UE inputs (e.g., CQI, RI, HARQ transmission status) and conditions (e.g., Doppler state and downlink transmission mode) that correspond to the specific subframe type in order to adapt the downlink rate to an appropriate MCS and TB count.

In the presence of interference caused by a neighboring cell with colliding reference signals (RS) in HetNet environment, the rank reported by the UE for the interference-limited subframes may be less than the rank reported for the interference-free subframes. However, if the neighboring cell is only partially loaded, the UE may be able to sustain the desired PDSCH decode performance if the interference-free reported rank were to be utilized in the interference-limited subframes as well. Such a capability will enable the UE to improve its received throughput in the interference-limited subframes. In order to achieve this, the rate adaptation block for interference-limited subframes may also utilize the inputs that are available to interference-free rate adaptation block to better estimate the MCS and TB count.

Figure 5:
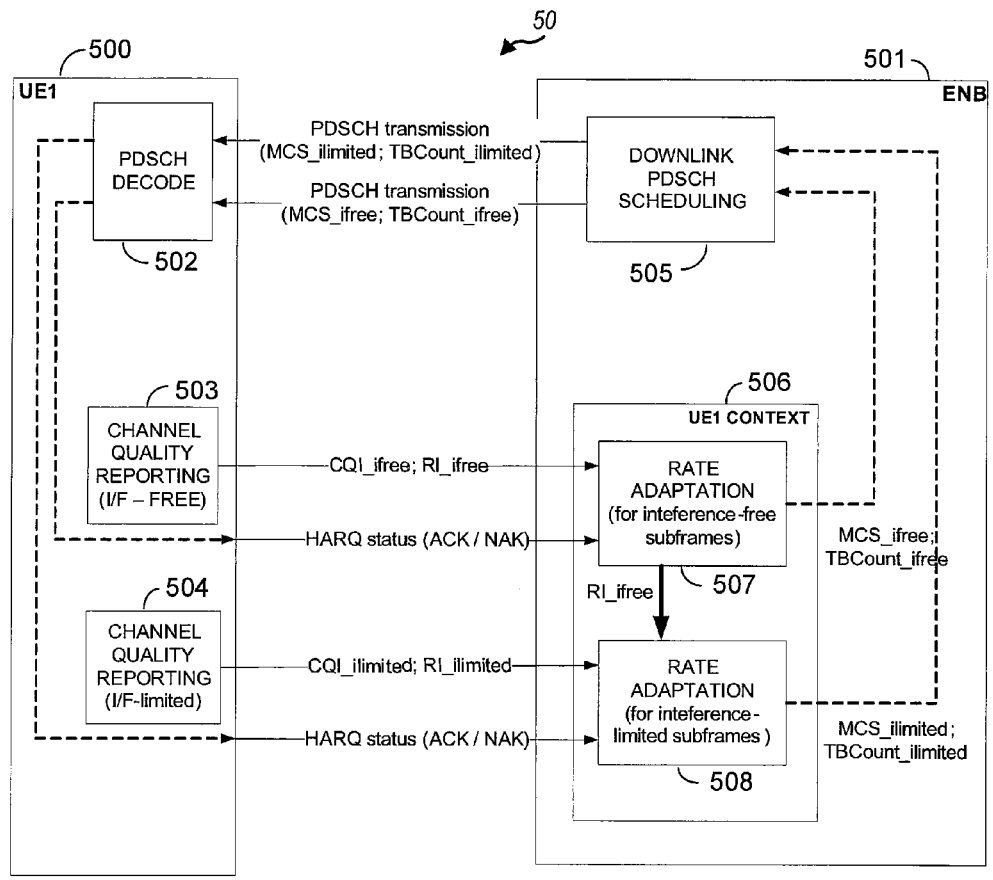
FIG. 5 is a block diagram illustrating a rate adaptation system configured according to one aspect of the present disclosure.

FIG. 5 is a block diagram illustrating a rate adaptation system 50 configured according to one aspect of the present disclosure. The UE 500 measures various channel quality metrics of both interference-free and interference-limited subframes. UE 500 reports both sets of channel quality metrics to an eNB 501 through interference-free channel quality reporting module 503 and interference-limited channel reporting module 504. UE 500 also reports HARQ status to the eNB 501. At eNB 501, a context module 506 includes two independent rate adaptation blocks 507 and 508. The rate adaptation blocks 507 and 508 use the channel quality metrics and HARQ status transmitted from UE 500 to set the MCS and TB count at the downlink PDSCH scheduling block 505. The downlink PDSCH scheduling block 505 transmits PDSCH for both the interference-free and interference-limited subframes to the PDSCH decoding module 502 of UE 500 in order for the UE 500 to schedule and set it uplink transmission characteristics.

The eNB 501 uses the interference-limited channel quality as the initial rank value. It then incrementally increases or decreases the rank based on various channel conditions experienced (e.g., HARQ, SINR, CQI, etc.) using the UE-reported interference-free rank as the maximum value that the rank may be increased to on the interference-limited subframes. Thus, based on these channel conditions, the eNB 501 may ignore the interference-limited rank indicator reported by UE 500.

Figure 6:
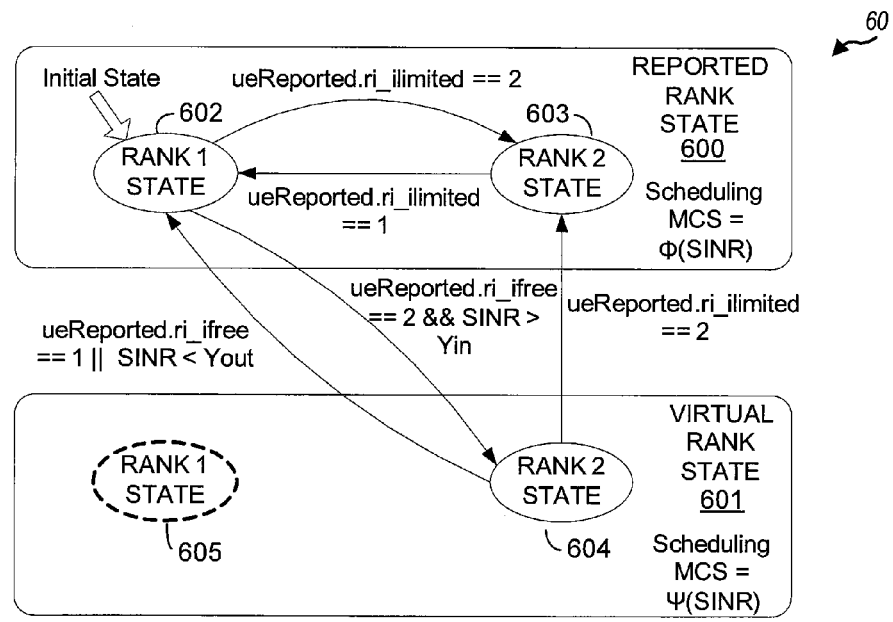
FIG. 6 is a diagram illustrating a state machine configured according to one aspect of the present disclosure.

FIG. 6 is a diagram illustrating a state machine 60 configured according to one aspect of the present disclosure. The rank selection portion of the scheduler for each UE is assumed to be represented as a three-state machine whose states are: (1) state 602: last reported RI_ilimited=1, scheduling RI on AC subframes equal to 1; (2) state 603: last reported RI_ilimited=2, scheduling RI on AC subframes equal to 2; and (3) state 604: last reported RI_ilimited=1, but scheduling RI on AC subframes is equal to 2. States 602 and 603 are baseline reported rank states 600, whereas state 604 is a new virtual rank states 601 introduced to manage the scenario where the eNB scheduler takes a different decision with respect to the UE-reported RI.

It should be noted that the state machine 60 of FIG. 6 is merely one example of a state machine that may be used with various aspects of the present disclosure. State machine 60 is specifically limited to a scenario in which only two possible transmission layers are available. The aspects of the present disclosure may be applicable to any number of available transmission layers. For example, in a system with 8 antennas, the eNB may select up to 8 transmission layers. In such systems, state machine 60 would include additional states to accommodate up to an RI of 8. The present disclosure is not limited to any certain number of antennas, available transmission layers, or states in a comparable state machine to state machine 60.

As noted above, in determining whether to increase or decrease the interference-limited rank from the UE-reported rank, various channel conditions may be used to determine the appropriateness of an increase or decrease in rank. Certain design parameters may be selected in order to provide measurable transition points where the eNB may determine to increase or decrease the rank instead of adjusting the MCS. The relationship between these design parameters may be represented by a set of spectral efficiency curves. A first curve, $\Phi$, represents this spectral efficiency as a relationship between the selected channel condition (e.g., SINR, CQI, etc.) and the MCS level of the reported rank. The selected channel condition may be the condition that the eNB scheduler assumes for a given UE. For example, when SINR is selected, the SINR is what the eNB's scheduler assumes for a given UE and is, in general, a combination of the reported CQI along with corrections applied in the eNB based on the closed-loop CQI backoff algorithm.

A second curve, $\Psi$, represents the spectral efficiency as a relationship between the selected channel condition and MCS level of the virtual rank, or the rank assigned by the eNB that is different from the reported rank. These spectral efficiency curves, $\Phi$ and $\Psi$, may be quantized into discrete values and used as look-up tables stored in memory by the eNB when analyzing the appropriate rank assignments.

In an example operation of state machine 60, initially state 602 is scheduled by the eNB when the last-reported RI for the interference-limited subframes is 1. State 602 corresponds to a Rank 1 state before the eNB has monitored its connection with the UE.

When a next UE-reported RI of the interference-limited subframes is changed to 2, the eNB scheduler changes the state of the downlink rate to state 603. This transition is based on the UE reporting of the new RI.

Beginning again at state 602, if the UE-reported RI of the interference-free subframes is 2 and the signal-to-interference-plus-noise ratio (SINR) is greater than the design parameter, $\gamma in$, then the eNB scheduler will switch to state 604, within the virtual rank state 601. The design parameter, $\gamma in$, represents the value of the selected channel condition (e.g., SINR, as used in FIG. 6) within the reported-rank spectral efficiency curve, $\Phi(SINR)$, that indicates to the eNB to increase the rank. Unlike the transition to state 603, which is based on the UE reporting an RI of 2 for interference-limited subframes, the transition to state 604 is based on the SINR of the UE achieving a measured threshold greater than $\gamma in$.

From state 604, if the next UE-reported RI of the interference-free subframes is 1 or if the SINR is less than the design parameter, $\gamma out$, then the eNB scheduler will switch to state 602 within reported rank states 600. The design parameter, $\gamma out$, represents the value of the selected channel condition within the virtual rank spectral efficiency curve, $\Phi(SINR)$, that indicates to the eNB to decrease the rank.

If, when the current state is state 604, the next UE-reported RI of the interference-limited subframes is 2, then the scheduler changes to state 603 of the reported rank states 600.

It should be noted that in alternative aspects of the present disclosure, a fourth state 605 may be defined in which the last UE-reported RI is 2, but the eNB scheduler reduces the RI to 1 in state 605 of the virtual rank states 601.

Table 1 is a pseudo-code representation of the algorithm to implement the terms of the state machine 60 (FIG. 6) and scheduling behavior in each state. Note that $\gamma in$, $\gamma out$, and $\gamma hist$ represent design parameters (in dB) with $\gamma hist \leq \gamma out \leq \gamma in$ and SINR represents the post-outer-loop SINR in dB (obtained by the eNB scheduler by combining the last UE-reported CQI with the current loop value, using dB representation). In this example, the eNB maintains a single backoff loop regardless of the ranks. Moreover, the two lookup tables for the $\Phi(SINR)$ and $\Psi(SINR)$ curves return the scheduling MCS as a function of the post-loop SINR, when the scheduling rank is equal to the UE-reported rank, or when it is mismatched, respectively. Note that $\Phi(SINR)$ is unchanged with respect to a baseline scheduler, whereas $\Psi(SINR)$ is a new lookup table which may be optimized through offline computations. In general, $\Psi(SINR) < \Phi(SINR)$ is expected for all SINR values. As an example, if the spectral efficiency is denoted with $\eta(MCS)$ (in bits per channel use) of a given MCS, the simplest choice is to ensure that $2*\eta[\Psi(SINR)]=\eta[\Phi(SINR)]$ as much as possible (equality cannot likely be achieved for all SINRs due to the quantization of the MCSs).

TABLE 1

```
// These checks are executed when a new report is received by the UE
(either RI or CQI or both) and after each ACK/NACK reception (due to
the update of the SINR)
if (current_state==1 && RI_ilimited==2)
    current_state=2
if (current_state==2 && RI_ilimited==1)
    current_state=1
If (current_state==1 && RI_ifree==2 && SINR> γin)
current_state=3
if (current_state==3 && RI_ilimited==2)
    current_state=2
if (current_state==3 && (RI_ifree=1 || SINR< γout)
    current_state=1
    if (SINR> γhist)
        outer_loop_value such that SINR= γhist
// These are the default behaviors of the scheduler (to be executed for each
TTI)
if (current_state==1 || current_state==2)
    //default behavior
    scheduling RI = RI_ilimited
    scheduling MCS = Φ(SINR)
if (current_state==3)
    // new behavior
    scheduling RI = 2
    scheduling MCS = Ψ(SINR)
```

Figure 7:
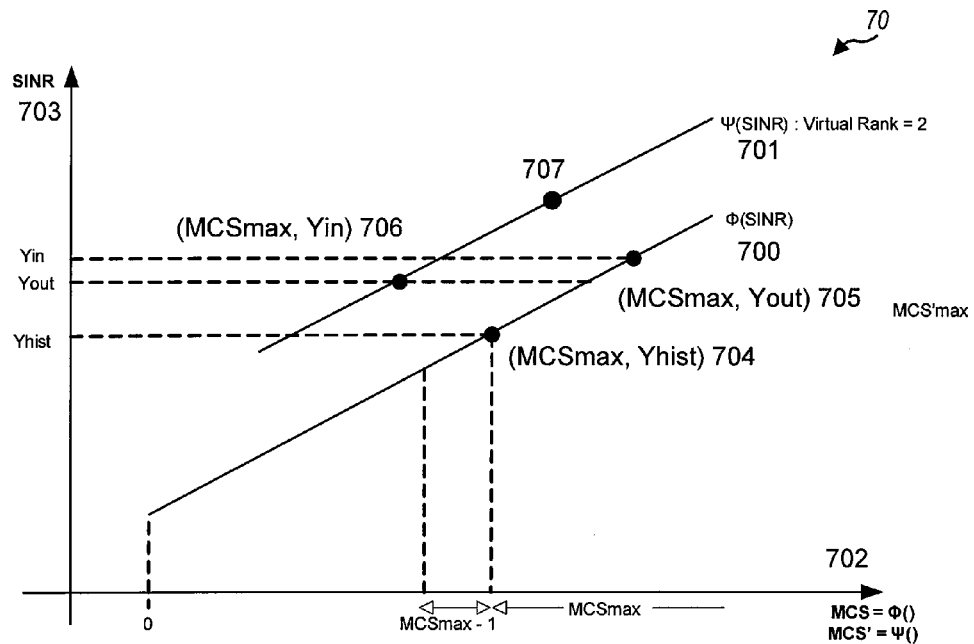
FIG. 7 is a graph illustrating the spectral efficiency curves of the reported rank $\Phi(SINR)$ and virtual rank $\Psi(SINR)$ curve.

FIG. 7 is a graph 70 illustrating the spectral efficiency curves of the reported rank Φ(SINR) 700 and virtual rank Ψ(SINR) 701. The x-axis 702 of the curve represents the MCS settings, while the y-axis 703 represents the SINR. At point 704, the eNB scheduler reaches the saturation point of the maximum MCS of the spectral efficiency Φ(SINR) 700 curve at SINR, γhist. However, instead of switching to the virtual rank Ψ(SINR) 701 curve at the maximum MCS and γhist, because the spectral efficiency curves have quantized steps in associated lookup tables, the spectral efficiency will continue to increase to point 705 at γin, after which the eNB scheduler will switch to the virtual rank Ψ(SINR) 701 curve at the entry quantization point 706 at γout. With the virtual rank set to 2 on the virtual rank Ψ(SINR) 701 curve, the spectral efficiency may continue to increase beyond the maximum MCS and beyond the SINR, γin, such as at point 707.

As illustrated in graph 70, prior to switching the interference-limited rank from an RI of 1 to an RI of 2 or from an RI of 2 to and RI of 1 when the UE-reported rank remains constant, the MCS of the interference-limited subframes (MCS_ilimited) may be gradually increased or decreased along the particular spectral efficiency curve that the eNB scheduler is currently using. In an example operation of the rate adaptation system 50 (FIG. 5) using an implementation of state machine 60 (FIG. 6), assume CQI_ifree=14, RI_ifree=2, CQI_ilimited=8 and RI_ilimited=1. The RI_ilimited is maintained at 1 and, if the HARQ termination success rate is better than the desired rate, the computed MCS_ilimited is gradually increased. When the MCS_ilimited reaches its saturation point (i.e. maximum allowed value), the rate adaption block for the interference-limited subframes could transition to using the same rank indicator of the interference-free subframes, e.g., RI_ifree (=2) and thereby increase the number of TBs count estimate that could be scheduled to further increase the throughput. At this RI transition point, the computed MCS_ilimited may be re-adjusted so as to maintain continuity in the served throughput. The MCS_ilimited can then again be increased gradually to target the desired HARQ success rate. The gradual increase or decrease of the MCS based on the measurement of the HARQ success rate prior to switching the RI is referred to as a backoff loop.

After eNB-initiated transition of RI_ilimited from 1 to 2, if the HARQ termination success rate starts to decline below the desired rate, the MCS_ilimited may then first be gradually decreased while maintain the RI_ilimited=2. If the HARQ success rate still cannot be met by decreasing MCS_ilimited, the RI_ilimited may be transitioned to 1 at some desirable threshold based upon UE reported channel condition.

Figures 8, 9:
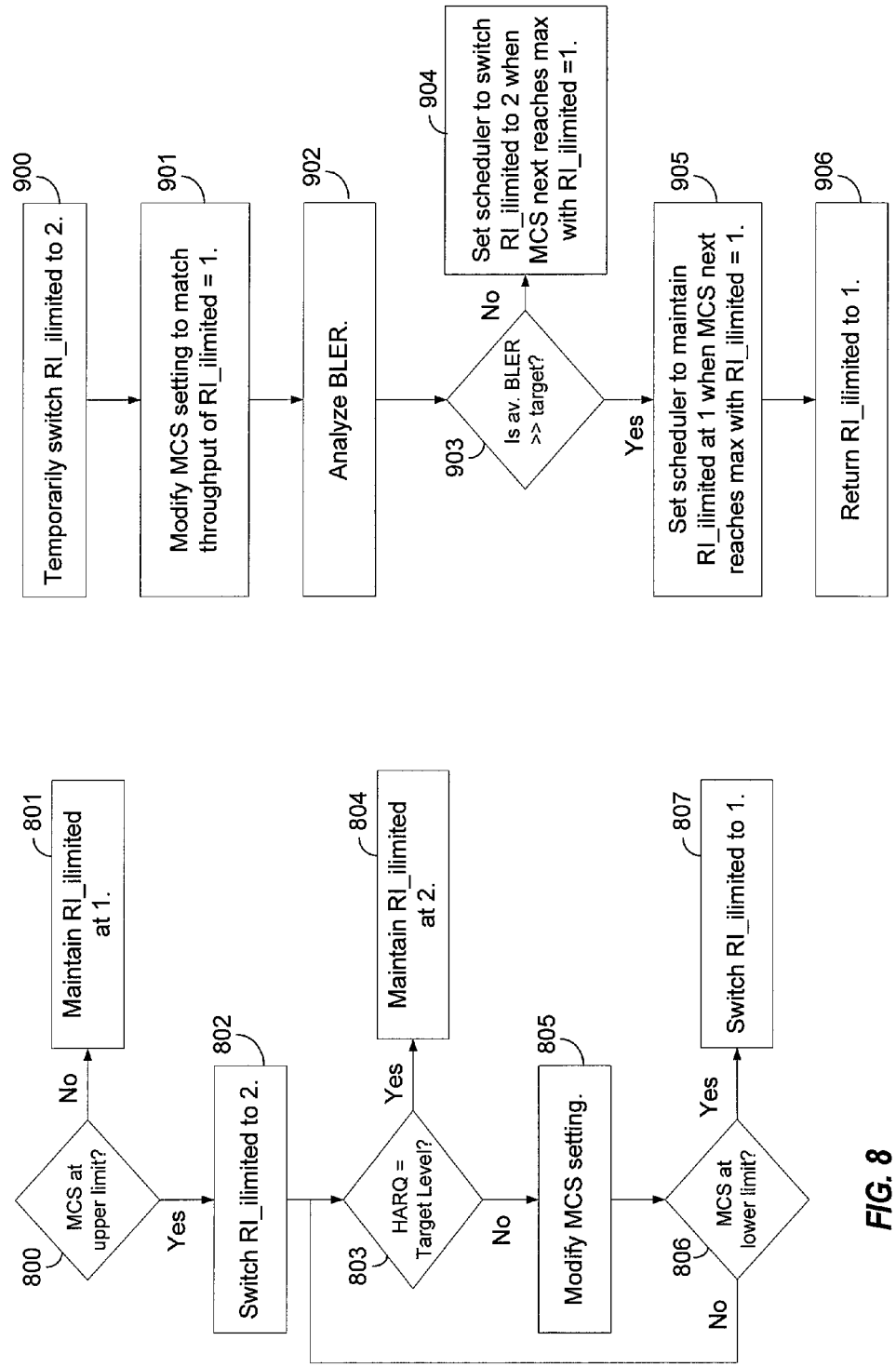
FIG. 8 is a functional block diagram illustrating example blocks executed to implement one aspect of the present disclosure.
FIG. 9 is a functional block diagram illustrating example blocks executed to implement an alternative aspect of the present disclosure.

In order to control the switching between RI levels for the interference-limited subframes, a backoff loop is used that monitors the performance and conditions of the downlink transmissions. FIG. 8 is a functional block diagram illustrating example blocks executed to implement one aspect of the present disclosure. In block 800, the eNB scheduler is operating at RI_ilimited=1 and determines whether the MCS level has reached an upper value limit. If the upper limit has not been reached, then, in block 801, the scheduler maintains RI_ilimited at 1. If, however, the upper MCS limit has been reached, then, in block 802, the scheduler switches the RI_ilimited to 2. A determination is made in block 803 whether the HARQ success rate has maintained at its target level. If so, then, in block 804, the eNB scheduler maintains the RI_ilimited at 2. Otherwise, if the HARQ success rate is not at the target level, then, in block 805, the MCS level is modified. The modification to the MCS level will depend on whether the HARQ success rate is higher or lower than the target value. In block 806, a determination is made whether the MCS has reached a lower limit. If so, then, in block 807, the eNB scheduler switches the RI_ilimited back to 1. Otherwise, if the MCS has not reached its lower limit, the process continues at block 803 for a re-check of the HARQ success rate. By following this set of procedures, the eNB may adapt its downlink transmission rates according to the performance and conditions with respect to that UE and monitor the continued performance when the RI for the interference limited subframes is selected to be something other than what the UE reported. If downlink performance deteriorates after switching to the virtual rank indicator, the eNB may switch back to the reported value.

Depending on the interference spatial characteristics, there may be a steep performance discontinuity when the RI_ilimited is switched from 1 to 2 or 2 to 1. In fact, for purposes of example, assume the UE experiences a highly directional interference, e.g., interference mainly coming from one single neighbor eNB, which is serving its own UEs with rank 1. In this case, if the considered UE is also served with a single stream, receive processing at the UE may be able to spatially separate the signal and the interference and, thus, the UE may experience a large signal-to-interference ratio after receive processing, even though the average carrier-to-interference ratio (C/I), not taking into account spatial processing, is low. Depending on the complex fading channel matrices from the serving eNB and the interfering eNB, as well as the effectiveness of the UE receive processing and CRS interference cancellation, the dominant interfering signal may be almost completely cancelled by the UE in the considered scenario. However, if the UE is served with a number of streams equal to or larger than the number of antennas, and/or it experiences a full-rank (omni-directional) interference, the effectiveness of interference suppression at the UE dramatically decreases because it is no longer possible to orthogonalize signal and interference.

Based on the above considerations, it may happen that, when RI_ilimited transitions from 1 to 2 due to the eNB backoff loop described above, block error rate performance steeply degrades, even though the MCS was adjusted to maintain throughput continuity. If the eNB's CQI backoff loop is not modified to deal with this issue, a ping-pong effect may arise, where the scheduling RI_ilimited is continuously switched back and forth between 1 and 2, along with MCS, and the target HARQ success rate may not be achieved.

If the interfering signal is full-rank (i.e., all spatial dimensions are equally likely—e.g., when multiple comparable interfering signals non-coherently overlap), spatial interference suppression at the UE is no longer as effective, and the discontinuity in the block error rate (BLER) performance between RI_ilimited=1 and RI_ilimited=2 may disappear. However, with the current LTE CQI/RI reporting scheme and based on the manner in which the UE evaluates optimal RI in a case of CRS collision, the eNB would not necessarily be aware of the spatial characteristics of the interference, and the proposed backoff loop should be robust regardless of the interference covariance matrix characteristics.

Referring back to FIG. 8, in an alternative aspect of the present disclosure, the MCS upper limit for the reported RI ($\gamma$in) can be set to a distinctly different SINR level than the MCS lower limit for the virtual RI ($\gamma$out) in order to increase the window between switching back and forth between RI values. This configuration would reduce the opportunity for the ping-pong effect.

FIG. 9 is a functional block diagram illustrating example blocks executed to implement an alternative aspect of the present disclosure. In such an alternative aspect, the ping-pong effect may be reduced by using probe signals in which the eNB periodically or aperiodically switches to a rank higher than the rank reported by the UE. In block 900, the probe begins when the eNB scheduler temporarily switches the RI_ilimited to 2. The eNB modifies the MCS settings, in block 901, in order to achieve a throughput that matches the level achieved at RI_ilimited=1. The block error rate (BLER) is analyzed in block 902. A determination is made, in block 903, whether the average BLER is substantially greater than the target level. If not, then, in block 904, the eNB scheduler is set to switch RI_ilimited to 2 when the MCS level next reaches its maximum level at RI_ilimited=1. If the average BLER is substantially greater than the target value, then, in block 905, the scheduler is set to maintain RI_ilimited at 1 when the MCS next reaches its maximum level at RI_ilimited=1. In other words, after the probe is completed and the RI_ilimited is switched back to normal operation at 1, the eNB scheduler will not switch the RI_ilimited to 2 when the MCS level next reaches its maximum level. The BLER analysis indicated that the conditions would not support such a switch. At block 906, the scheduler ceases the probe and returns the RI_ilimited to 1.

Figure 10:
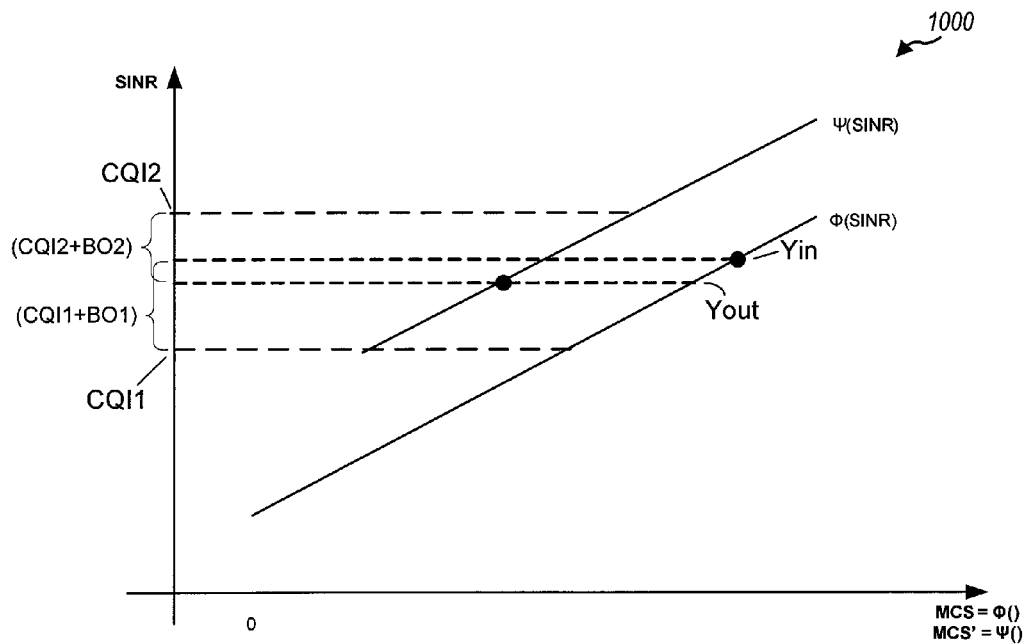
FIG. 10 is a graph illustrating the spectral efficiency curves of the reported rank $\Phi(SINR)$ and virtual rank $\Psi(SINR)$ curve and multiple backup loops configured according to one aspect of the present disclosure.

FIG. 10 is a graph 1000 illustrating the spectral efficiency curves of the reported rank $\Phi$(SINR) and virtual rank $\Psi$(SINR) curve and multiple backup loops configured according to one aspect of the present disclosure. The performance of the downlink transmissions when scheduled using the UE-reported RI may be much different than that when using the virtual RI. As such, the described aspect of FIG. 10 uses multiple backoff loops—one for each state. When the eNB is scheduling using the UE-reported RI, the backoff loop associated with the UE-reported RI state (BO1) uses the ACK/NACK bits for estimating the HARQ success rate. Similarly, when the eNB is scheduling using the virtual RI, the virtual RI backoff loop (BO2) uses the ACK/NACK bits when operating in the virtual RI to estimate the HARQ success rate for BO2. The two loops, BO1 and BO2, may converge to a completely different value due to the discontinuity between the two states. When determining which state to select, the eNB will compare the two loops, BO1 and BO2, to determine which state will result in a higher served throughput.

While scheduling downlink transmission using the UE-reported RI, the eNB receives the CQI1 reported from the UE. The backoff loop, BO1, is reflected in FIG. 10 a large positive value (e.g., +10 dB, +12 dB, etc.) The post-outer-loop on the reported rank $\Phi$(SINR) curve is determined by the reported CQI1+BO1. Therefore, while operating with the reported RI, the post-outer-loop places the spectral efficiency at the upper limit $\gamma$in, even though the reported CQI was much further below the upper limit $\gamma$in. The eNB uses the ACK/NACK bits while operating at the reported RI to maintain the backoff loop BO1. The size of BO1 reflects the general reliability of the operations at the reported RI.

While scheduling downlink transmission using the virtual RI, the eNB receives the CQI2 reported from the UE. The virtual rank backoff loop, BO2, is reflected in FIG. 10 as a smaller negative value (e.g., −5 dB, −10 dB, etc.) The post-outer-loop on the virtual rank $\Psi$(SINR), then is the reported CQI2+BO2. However, since BO2 is a negative value, the post-outer-loop results in the lower limit $\gamma$out, which is lower than the reported CQI2. The low value of the virtual rank backoff loop, BO2, also reflects the lower reliability of operations with the virtual rank.

In many practical scenarios, using an increased RI for interference-limited subframes may, in fact, lead to much worse performance than using the UE-reported RI. In alternative aspects of the present disclosure, the backoff loop may use different loop sizes depending on whether the eNB has scheduled downlink transmissions using the UE-reported RI or the virtual RI in order to ensure that the eNB can quickly return to the UE-reported RI without experiencing a considerable length of time with severely decreased performance.

Figure 11:
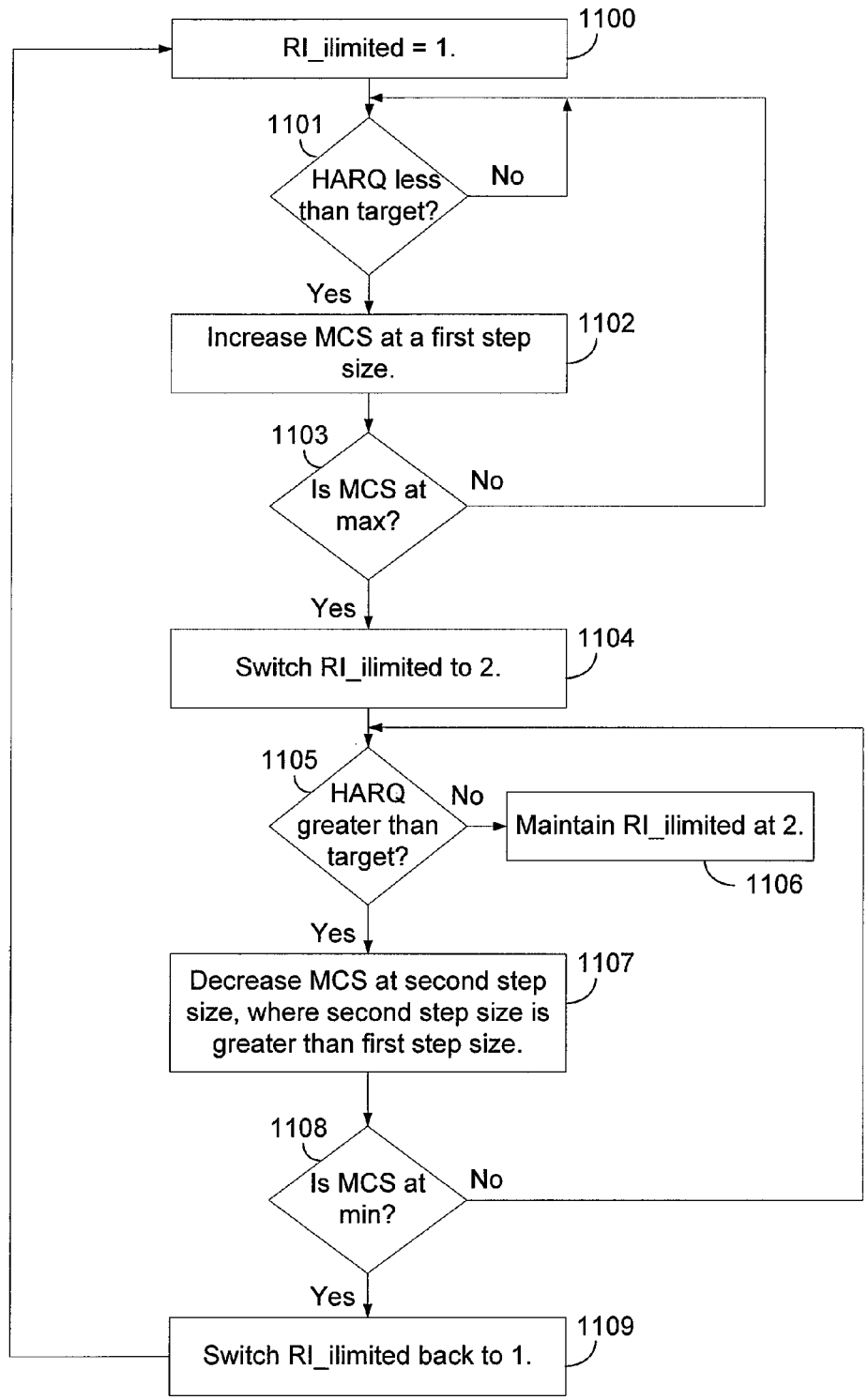
FIG. 11 is a functional block diagram illustrating example blocks executed to implement one aspect of the present disclosure.

FIG. 11 is a functional block diagram illustrating example blocks executed to implement one aspect of the present disclosure. In block 1100, the eNB begins scheduling downlink transmissions using the RI_ilimited=1. At block 1101, a determination is made whether the HARQ success rate is less than the target value. If not, then, the eNB continues to check the HARQ success rate in block 1101. If the HARQ success rate is less than the target level, then, in block 1102, the MCS is increased at a first step size. In block 1103, a determination is made whether the MCS has reached its max level. If not, then the eNB continues to monitor the HARQ success rates at block 1101. If the max level has been reached, then, in block 1104, the eNB switches the RI_ilimited to 2. The eNB monitors the HARQ success rate and, in block 1105, makes a determination of whether the HARQ success rate is greater than the target value. If not, then, in block 1106, the eNB scheduler maintains the RI_ilimited at 2. If the HARQ success rate is greater than the target value, then, in block 1107, the schedule will decrease the MCS at a second step size, where the second step size is greater than the first step size. At block 1108, a determination is made whether the MCS has reached its minimum level for the virtual rank selections. If not, then the eNB continues to monitor the HARQ success rates in block 1105. If MCS has reached its minimum level, then in block 1109, the scheduler switches the RI_ilimited back to 1 and the process repeats from the beginning at block 1100. In this manner, when the eNB scheduler selects the RI not reported by the UE, the larger second step size ensures that the eNB can return to a more appropriate RI level more quickly.

In additional practical scenarios, it may be beneficial to accommodate an adaptive, variable backoff loop range. FIG.

12 is a functional block diagram illustrating example blocks executed to implement one aspect of the present disclosure. In block 1200, adjustments to the backoff loop range are made to accommodate extreme interference conditions. For example, where interference arises from a bursty neighboring eNB, periods of little to no interference may be followed by periods of high interference. In such conditions, the eNB scheduler would maintain a relatively short backoff loop range, so that the eNB can quickly return to UE-reported RI levels when periods of downlink transmissions have been scheduled using the virtual RI levels during the quiet periods of the interfering eNB. Additionally, interference may arise from an interfering transmitter that has a very slow duty cycle and is, thus, slow to change interference patterns. In such scenarios, the eNB scheduler may lengthen the backoff loop range.

In block 1201, a backoff loop triggering event is detected by the eNB. For example, a triggering even may be defined as receiving a sequence of consecutive NACKs from the UE or alternatively receiving a certain number of NACKs during the last number of HARQ reports. Upon detecting such a triggering event, the eNB would set the backoff loop to a certain neutral range, in block 1202, that may accommodate a broader range of the transmission conditions. Therefore, the eNB would be able to adapt its backoff loop range to address current transmission conditions being experienced, but if some triggering event is detected while the loop range is in one of its extended states, the eNB may immediately reset the loop range to a more universally accommodating size.

Figure 13:
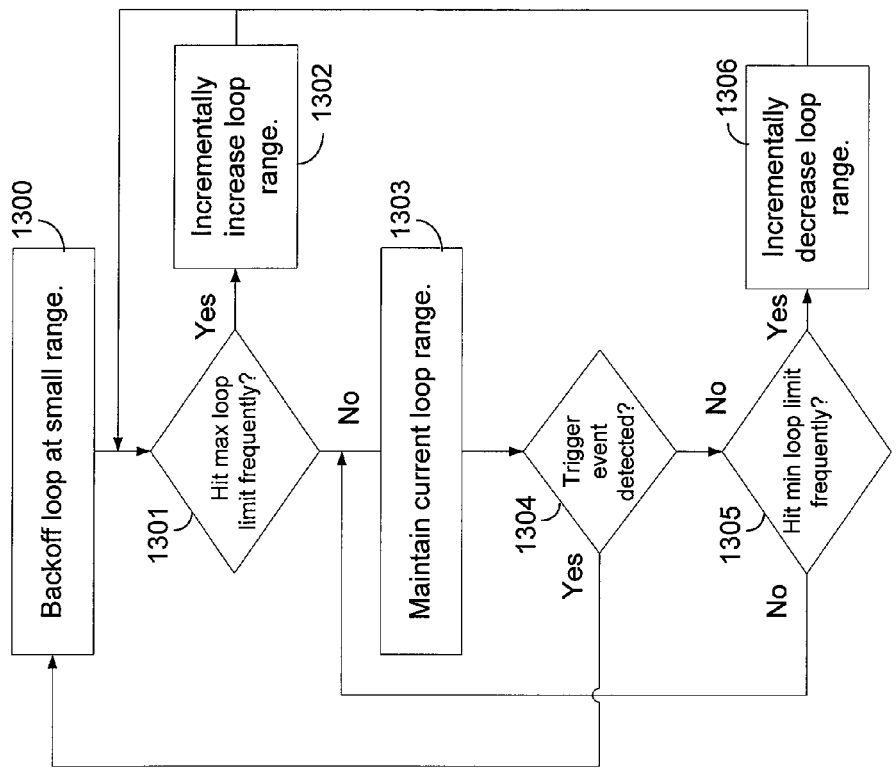
FIG. 13 is a functional block diagram illustrating example blocks executed to implement one aspect of the present disclosure.
Figure 12:
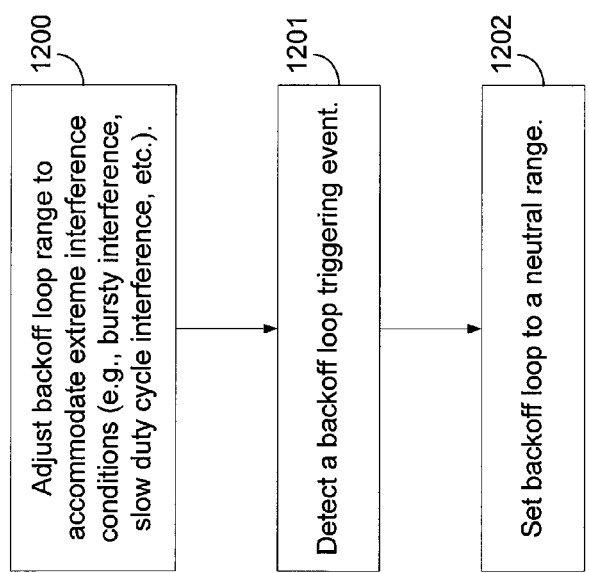
FIG. 12 is a functional block diagram illustrating example blocks executed to implement one aspect of the present disclosure.

FIG. 13 is a functional block diagram illustrating example blocks executed to implement one aspect of the present disclosure. In block 1300, the eNB scheduler begins the backoff loop with a small range. A determination is made, in block 1301, whether the backoff loop is frequently hitting its maximum range. If the loop is frequently hitting its max range, then, in block 1302, the eNB incrementally and gradually increases the loop range, and continues monitoring for the max frequency in block 1301. If the loop is not frequently hitting its maximum range, then, in block 1303, the eNB scheduler maintains the current loop range. In block 1304, a determination is made whether a backoff loop triggering event has been detected. The backoff loop triggering event of block 1304 may be similar to the triggering event of block 1201 (FIG. 12). If so, then, the eNB scheduler resets the backoff loop range to the smaller range in block 1300 and restarts the process. If no triggering event is detected, then, in block 1305, a determination is made whether the loop is frequently hitting its minimum loop limit. If so, then, in block 1306, the eNB incrementally decreases the loop range. After decreasing the loop range, the eNB will continue the monitoring process at block 1301. If the loop minimum is not frequently being hit, then the eNB maintains the current loop range, in block 1303, and then monitors to detect any triggering event, in block 1304, as previously discussed. This adaptive process allows the eNB to adjust the loop range according to the prevailing transmission conditions, but also provides a quick return to a base range should some pre-defined triggering event be detected.

In one configuration, the eNB 110 configured for wireless communication includes means for receiving a first rank indication from a UE, said first rank indication referring to a first set of reference resources, means for receiving a second rank indication from said UE, said second rank indication referring to a second set of reference resources, means for selecting a transmission rank and setting a transmission rate sustainable by said UE on said first set of resources, wherein said selected transmission rank is different from said first rank indication, means for transmitting data packets to said UE on said second set of resources using said second rank indication and a second transmission rate based on said second rank indication, and means for transmitting data packets to said UE on said first set of resources using said selected transmission rank and transmission rate. In one aspect, the aforementioned means may be the processor(s), the controller/processor 440, the memory 442, the scheduler 444, the receive processor 438, the MIMO detector 436, the demodulators 432a-t, and the antennas 434a-t configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6, 8, 9, and 11-13 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving a first rank indication from a user equipment (UE) in a channel quality report, said first rank indication corresponding to a first set of resources;
   receiving a second rank indication from said UE in said channel quality report, said second rank indication corresponding to a second set of resources;
   selecting a transmission rank and setting a transmission rate sustainable by said UE on said first set of resources, wherein said selected transmission rank is different from said first rank indication;
   transmitting data packets to said UE on said first set of resources using said selected transmission rank and transmission rate; and
   transmitting data packets to said UE on said second set of resources using said second rank indication and a second transmission rate based on said second rank indication.

2. The method of claim 1, wherein said first set of resources refers to interference-limited subframes and the second set of resources refers to interference-free subframes.

3. The method of claim 1, wherein said selected transmission rank is said second rank indication.

4. The method of claim 1, wherein said first rank indication and said second rank indication each comprise one of a plurality of rank indicator values.

5. The method of claim 1 further comprising:
   monitoring an error rate associated with said data packets transmitted on said first set of resources; and
   decreasing said transmission rate on said first set of resources in response to detecting said error rate increasing.

6. The method of claim 5 further comprising:
   re-selecting another transmission rate range associated with another rank indication different from said selected transmission rank in response to said transmission rate reaching a limit of said transmission rate range; and
   transmitting data packets to said UE on said first set of resources using said another data transmission rate within said another transmission rate range.

7. The method of claim 5 wherein said decreasing is performed according to a first amount when said transmission rate range is selected according to said first rank indicator and comprises a second amount when said transmission rate range is selected according to said selected transmission rank, said second amount larger than said first amount.

8. The method of claim 5 wherein an amount of said decreasing is determined based on said detected error rate.

9. The method of claim 1 further comprising:
   monitoring an error rate associated with said data packets transmitted on said first set of resources using said selected transmission rank;
   generating a first backoff value based on said error rate associated with said selected transmission rank;
   monitoring said error rate associated with said data packets transmitted on said first set of resources using said first rank indicator;
   generating a second backoff value based on said error rate associated with said first rank indicator;
   determining which of said selected transmission rank and said first rank indicator provides a higher served throughput based on a comparison of said first backoff value and said second backoff value.

10. The method of claim 1, wherein selecting said transmission rank comprises:
    transmitting data packets to said UE on said first set of resources using said first rank indicator;
    temporarily switching said transmission rank to said selected transmission rank different from said first rank indicator;
    transmitting data packets to said UE on said first set of resources using said selected transmission rank;
    modifying said transmission rate to match a throughput achieved during transmission of said data packets using said first rank indicator;
    analyzing a block error rate associated with said data packets transmitted using said selected transmission rank;

setting, in response to said block error rate not being substantially larger than a target block error rate, a scheduler to switch said rank indicator to said selected transmission rank different from said first rank indicator when said transmission rate reaches a maximum value for transmission using said first rank indicator; and switching said transmission rank back to said first rank indicator.

11. The method of claim 1 further comprising:

monitoring an error rate associated with said transmitting data packets on said first set of resources using said selected transmission rank;

generating a backoff value based on said error rate;

adjusting said backoff value to accommodate extreme interference conditions; and setting said backoff value to a neutral range in response to detecting a backoff value triggering event.

12. The method of claim 1 further comprising:

generating a backoff value having a backoff value range, said backoff value range initially set to a small decibel range;

determining whether monitored error rates intersect a limit of said backoff value range greater than a predetermined frequency;

modifying said backoff value range to accommodate said limit intersections; and re-setting said backoff value to said small decibel range in response to detecting a backoff value triggering event.

13. An evolved Node B (eNB) configured for wireless communication, comprising:

means for receiving a first rank indication from a user equipment (UE) in a channel quality report, said first rank indication corresponding to a first set of resources;

means for receiving a second rank indication from said UE in said channel quality report, said second rank indication corresponding to a second set of resources;

means for selecting a transmission rank and setting a transmission rate sustainable by said UE on said first set of resources, wherein said selected transmission rank is different from said first rank indication;

means for transmitting data packets to said UE on said first set of resources using said selected transmission rank and transmission rate; and means for transmitting data packets to said UE on said second set of resources using said second rank indication and a second transmission rate based on said second rank indication.

14. The eNB of claim 13, wherein said first set of resources refers to interference-limited subframes and the second set of resources refers to interference-free subframes.

15. The eNB of claim 13, wherein said selected transmission rank is said second rank indication.

16. The eNB of claim 13, wherein said first rank indication and said second rank indication each comprise one of a plurality of rank indicator values.

17. The eNB of claim 13 further comprising:

means for monitoring an error rate associated with said data packets transmitted on said first set of resources; and means for decreasing said transmission rate on said first set of resources in response to detecting said error rate increasing.

18. The eNB of claim 17 further comprising:

means for re-selecting another transmission rate range associated with another rank indication different from said selected transmission rank in response to said transmission rate reaching a limit of said transmission rate range; and means for transmitting data packets to said UE on said first set of resources using said another data transmission rate within said another transmission rate range.

19. The eNB of claim 13 further comprising:

means for monitoring an error rate associated with said data packets transmitted on said first set of resources using said selected transmission rank;

means for generating a first backoff value based on said error rate associated with said selected transmission rank;

means for monitoring said error rate associated with said data packets transmitted on said first set of resources using said first rank indicator;

means for generating a second backoff value based on said error rate associated with said first rank indicator;

means for determining which of said selected transmission rank and said first rank indicator provides a higher served throughput based on a comparison of said first backoff value and said second backoff value.

20. The eNB of claim 13, wherein selecting said transmission rank comprises:

means for transmitting data packets to said UE on said first set of resources using said first rank indicator;

means for temporarily switching said transmission rank to said selected transmission rank different from said first rank indicator;

means for transmitting data packets to said UE on said first set of resources using said selected transmission rank;

means for modifying said transmission rate to match a throughput achieved during transmission of said data packets using said first rank indicator;

means for analyzing a block error rate associated with said data packets transmitted using said selected transmission rank;

means, executable in response to said block error rate not being substantially larger than a target block error rate, for setting a scheduler to switch said rank indicator to said selected transmission rank different from said first rank indicator when said transmission rate reaches a maximum value for transmission using said first rank indicator; and means for switching said transmission rank back to said first rank indicator.

21. The eNB of claim 13 further comprising:

means for monitoring an error rate associated with said data packets transmitted on said first set of resources using said selected transmission rank;

means for generating a backoff value based on said error rate;

means for adjusting said backoff value to accommodate extreme interference conditions; and means, executable in response to detecting a backoff value triggering event, for setting said backoff value to a neutral range.

22. The eNB of claim 13 further comprising:

means for generating a backoff value having a backoff value range, said backoff value range initially set to a small decibel range;

means for determining whether monitored error rates intersect a limit of said backoff value range greater than a predetermined frequency;

means for modifying said backoff value range to accommodate said limit intersections; and means, executable in response to detecting a backoff value triggering event, for re-setting said backoff value to said small decibel range.

23. A computer program product for wireless communications in a wireless network, comprising:
a non-transitory computer-readable medium having program code recorded thereon, said program code comprising:
program code to receive a first rank indication from a user equipment (UE) in a channel quality report, said first rank indication corresponding to a first set of resources;
program code to receive a second rank indication from said UE in said channel quality report, said second rank indication corresponding to a second set of resources;
program code to select a transmission rank and setting a transmission rate sustainable by said UE on said first set of resources, wherein said selected transmission rank is different from said first rank indication;
program code to transmit data packets to said UE on said first set of resources using said selected transmission rank and transmission rate; and
program code to transmit data packets to said UE on said second set of resources using said second rank indication and a second transmission rate based on said second rank indication.

24. The computer program product of claim 23, wherein said first set of resources refers to interference-limited subframes and the second set of resources refers to interference-free subframes.

25. The computer program product of claim 23, wherein said selected transmission rank is said second rank indication.

26. The computer program product of claim 23, wherein said first rank indication and said second rank indication each comprise one of a plurality of rank indicator values.

27. The computer program product of claim 23 further comprising:
program code to monitor an error rate associated with said data packets transmitted on said first set of resources; and
program code to decrease said transmission rate on said first set of resources in response to detecting said error rate increasing.

28. The computer program product of claim 27 further comprising:
program code to re-select another transmission rate range associated with another rank indication different from said selected transmission rank in response to said transmission rate reaching a limit of said transmission rate range; and
program code to transmit data packets to said UE on said first set of resources using said another data transmission rate within said another transmission rate range.

29. The computer program product of claim 23 further comprising:
program code to monitor an error rate associated with said data packets transmitted on said first set of resources using said selected transmission rank;
program code to generate a first backoff value based on said error rate associated with said selected transmission rank;
program code to monitor said error rate associated with said data packets transmitted on said first set of resources using said first rank indicator;
program code to generate a second backoff value based on said error rate associated with said first rank indicator;
program code to determine which of said selected transmission rank and said first rank indicator provides a higher served throughput based on a comparison of said first backoff value and said second backoff value.

30. The computer program product of claim 23, wherein said program code to select said transmission rank comprises:
program code to transmit data packets to said UE on said first set of resources using said first rank indicator;
program code to temporarily switch said transmission rank to said selected transmission rank different from said first rank indicator;
program code to transmit data packets to said UE on said first set of resources using said selected transmission rank;
program code to modify said transmission rate to match a throughput achieved during transmission of said data packets using said first rank indicator;
program code to analyze a block error rate associated with said data packets transmitted using said selected transmission rank;
program code, executed in response to said block error rate not being substantially larger than a target block error rate, to set a scheduler to switch said rank indicator to said selected transmission rank different from said first rank indicator when said transmission rate reaches a maximum value for transmission using said first rank indicator; and
program code to switch said transmission rank back to said first rank indicator.

31. The computer program product of claim 23 further comprising:
program code to monitor an error rate associated with said data packets transmitted on said first set of resources using said selected transmission rank;
program code to generate a backoff value based on said error rate;
program code to adjust said backoff value to accommodate extreme interference conditions; and
program code, executable in response to detecting a backoff value triggering event, to set said backoff value to a neutral range.

32. The computer program product of claim 23 further comprising:
program code to generate a backoff value having a backoff value range, said backoff value range initially set to a small decibel range;
program code to determine whether monitored error rates intersect a limit of said backoff value range greater than a predetermined frequency;
program code to modify said backoff value range to accommodate said limit intersections; and
program code, executable in response to detecting a backoff value triggering event, to re-set said backoff value to said small decibel range.

33. An evolved Node B (eNB) configured for wireless communication, said apparatus comprising:
at least one processor; and
a memory coupled to said at least one processor,
wherein said at least one processor is configured:
to receiving a first rank indication from a user equipment (UE) in a channel quality report, said first rank indication corresponding to a first set of resources;

to receive a second rank indication from said UE in said channel quality report, said second rank indication corresponding to a second set of resources;

to select a transmission rank and setting a transmission rate sustainable by said UE on said first set of resources, wherein said selected transmission rank is different from said first rank indication;

to transmit data packets to said UE on said first set of resources using said selected transmission rank and transmission rate; and to transmit data packets to said UE on said second set of resources using said second rank indication and a second transmission rate based on said second rank indication.

34. The eNB of claim 33, wherein said first set of resources refers to interference-limited subframes and the second set of resources refers to interference-free subframes.

35. The eNB of claim 33, wherein said selected transmission rank is said second rank indication.

36. The eNB of claim 33, wherein said first rank indication and said second rank indication each comprise one of a plurality of rank indicator values.

37. The eNB of claim 33, wherein said at least one processor is further configured:
to monitor an error rate associated with said data packets transmitted on said first set of resources; and
to decrease said transmission rate on said first set of resources in response to detecting said error rate increasing.

38. The eNB of claim 37, wherein said at least one processor is further configured:
to re-select another transmission rate range associated with another rank indication different from said selected transmission rank in response to said transmission rate reaching a limit of said transmission rate range; and
to transmit data packets to said UE on said first set of resources using said another data transmission rate within said another transmission rate range.

39. The eNB of claim 33, wherein said at least one processor is further configured:
to monitor an error rate associated with said data packets transmitted on said first set of resources using said selected transmission rank;
to generate a first backoff value based on said error rate associated with said selected transmission rank;
to monitor said error rate associated with said data packets transmitted on said first set of resources using said first rank indicator;
to generate a second backoff value based on said error rate associated with said first rank indicator;

to determine which of said selected transmission rank and said first rank indicator provides a higher served throughput based on a comparison of said first backoff value and said second backoff value.

40. The eNB of claim 33, wherein said configuration of said at least one processor to select said transmission rank comprises configuration of said at least one processor:
to transmit data packets to said UE on said first set of resources using said first rank indicator;
to temporarily switch said transmission rank to said selected transmission rank different from said first rank indicator;
to transmit data packets to said UE on said first set of resources using said selected transmission rank;
to modify said transmission rate to match a throughput achieved during transmission of said data packets using said first rank indicator;
to analyze a block error rate associated with said data packets transmitted using said selected transmission rank;
to set, in response to said block error rate not being substantially larger than a target block error rate, a scheduler to switch said rank indicator to said selected transmission rank different from said first rank indicator when said transmission rate reaches a maximum value for transmission using said first rank indicator; and
to switch said transmission rank back to said first rank indicator.

41. The eNB of claim 33, wherein said at least one processor is further configured:
to monitor an error rate associated with said data packets transmitted on said first set of resources using said selected transmission rank;
to generate a backoff value based on said error rate;
to adjust said backoff value to accommodate extreme interference conditions; and
to set said backoff value to a neutral range in response to detecting a backoff value triggering event.

42. The eNB of claim 33, wherein said at least one processor is further configured:
to generate a backoff value having a backoff value range, said backoff value range initially set to a small decibel range;
to determine whether monitored error rates intersect a limit of said backoff value range greater than a predetermined frequency;
to modify said backoff value range to accommodate said limit intersections; and
to re-set said backoff value to said small decibel range in response to detecting a backoff value triggering event.

* * * * *